United States Patent [19]

Colditz

[11] Patent Number: 4,475,290

[45] Date of Patent: Oct. 9, 1984

[54] FLEXIBLE TANK GAUGE

[75] Inventor: Eugene F. Colditz, Huntington Beach, Calif.

[73] Assignee: Kaiser Aerospace & Electronics Corporation, Oakland, Calif.

[21] Appl. No.: 317,834

[22] Filed: Nov. 3, 1981

Related U.S. Application Data

[63] Continuation of Ser. No. 126,429, Mar. 3, 1980.

[30] Foreign Application Priority Data

Jun. 1, 1979 [GB] United Kingdom ................ 7919122

[51] Int. Cl.³ ............................................. G01F 23/12
[52] U.S. Cl. .......................... 33/126.7 R; 33/126.7 A; 73/314; 73/DIG. 5; 73/319
[58] Field of Search ................... 73/DIG. 5, 322, 314, 73/319; 33/137 R, 126.7 A, 126.7 R

[56] References Cited

U.S. PATENT DOCUMENTS

| | | | |
|---|---|---|---|
| 950,581 | 3/1910 | Tracy | 33/137 R |
| 1,589,269 | 6/1926 | Van Daam | 73/322 |
| 1,964,248 | 6/1934 | Buck | 33/137 R |
| 2,765,535 | 10/1956 | Weber | 33/137 R |
| 2,949,776 | 8/1960 | Field | 73/290 R |
| 3,136,067 | 6/1964 | Horner | 33/137 R |
| 3,330,709 | 7/1967 | Zelnick | 33/137 R |
| 3,407,660 | 10/1968 | Nusbaum | 73/322 |
| 3,572,122 | 3/1971 | Nusbaum | 73/314 |

FOREIGN PATENT DOCUMENTS

| | | | |
|---|---|---|---|
| 499286 | 2/1920 | France | 73/322 |
| 507614 | 12/1954 | Italy | 73/DIG. 5 |

Primary Examiner—Charles Frankfort
Assistant Examiner—Denis E. Corr
Attorney, Agent, or Firm—Marvin H. Kleinberg

[57] ABSTRACT

A flexible stick tank gauge is made of a thin metal or plastic tape. The tape is sufficiently thick to be self-supporting when held vertically from the lower end. Alternatively, the tape is curved to be a narrow sector of a cylinder. Measuring indicia are applied to at least one surface of the tape. The tape remains flexible at extreme environments of temperatures and will not break in normal use such as airline fuel measuring operations.

6 Claims, 5 Drawing Figures

U.S. Patent     Oct. 9, 1984     4,475,290
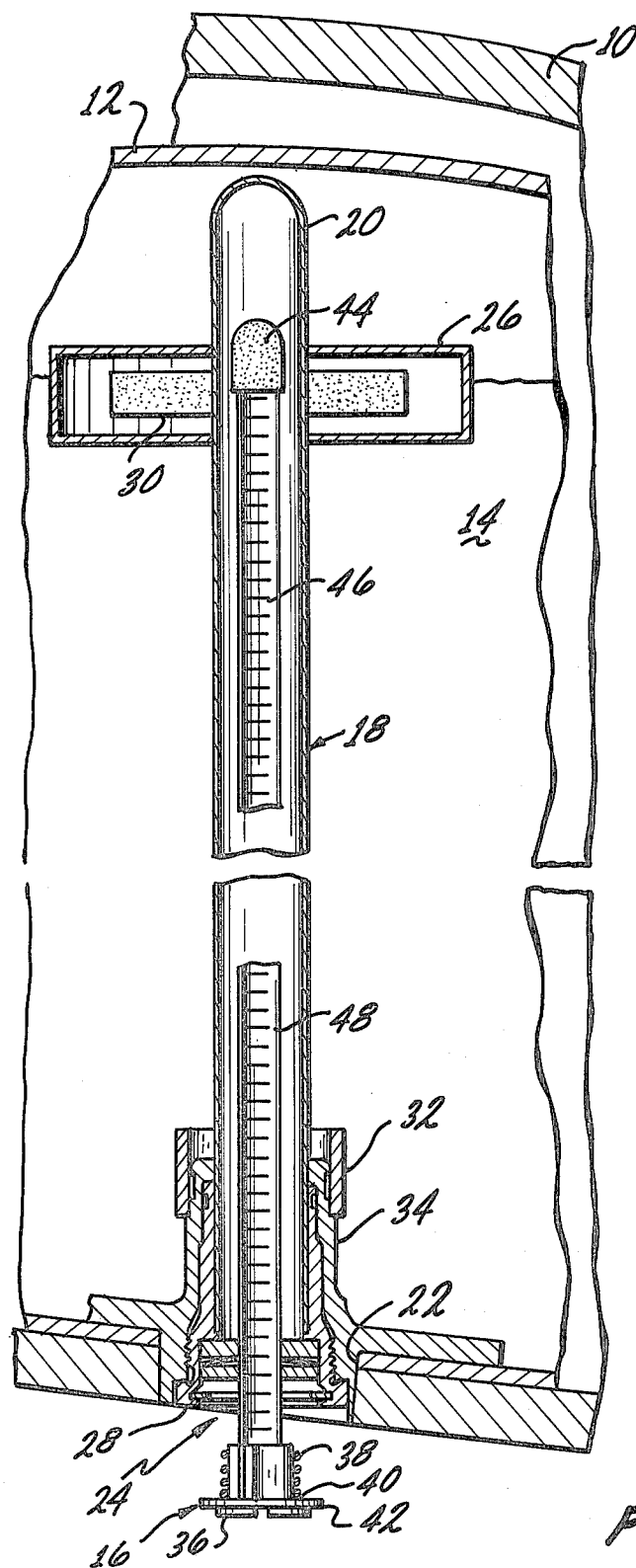
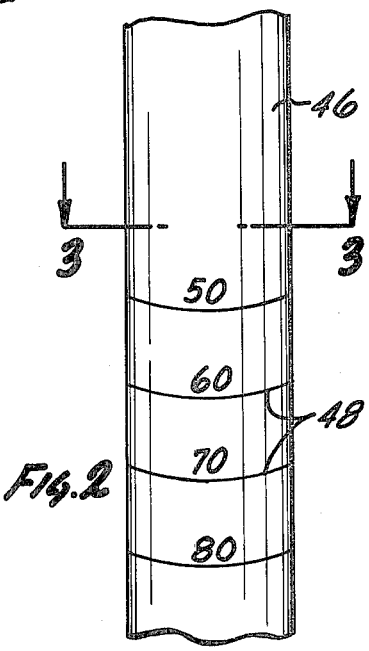
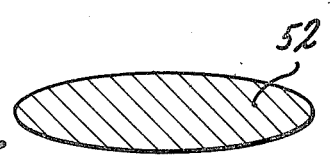

FLEXIBLE TANK GAUGE

This is a continuation of application Ser. No. 06/126,429, filed Mar. 3, 1980.

BACKGROUND OF THE INVENTION

1. Field of Invention

The invention relates generally to means for measuring the level of liquid in a tank and particularly to a measuring stick type of gauge element wherein there is access to the gauge element from the exterior of the tank but the element itself is not exposed to the contents of the tank. Auxiliary means are provided to enable the operator to withdraw the gauge element to obtain a true indication of the liquid level. Gauge means embodying a tubular housing are mounted vertically in a tank with a movable gauge element therein and a float on the outside thereof together with means for orienting the gauge element vertically with reference to the float.

The invention is concerned with the provision of a flexible, extended measuring gauge element in the form of a band or tape like member having magnetic means at its remote end and mounted for vertical movement in an outer housing extending into a tank with the interior of the housing sealed off from the interior of the tank, in conjunction with a float on the outside of the housing carrying means for magnetically attracting the magnetic means of the gauge element.

2. Description of the Prior Art

It has been well known in the past to use solid, substantially rigid but lightweight rods which are either tubular, square or rectangular. Typical stick gauges are disclosed, for example in the patents to H. Nussbaum, U.S. Pat. Nos. 3,407,660 and 3,572,122, assigned to a predecessor in interest of the assignee of the present invention. Of additional interest is the patent to J. H. Field, et al, U.S. Pat. No. 2,949,776, also assigned to the predecessor in interest of the assignee herein.

Such rods have been made of fiberglass or other lightweight plastic materials. A problem with such substantially rigid gauge members of the prior art has been the fragility of such members. In the rough handling that is sometimes accorded the gauges, the rods have been known to break and therefore require replacement.

In addition, the task of imprinting or otherwise adding indicia to an extended circular, square or rectangular rod has required special and expensive printing processes. Because of the odd shape, the indicia have generally been added through expensive and time-consuming silk screen processes. Conventional high speed printing techniques which have obvious cost and speed advantages, have not generally been available.

SUMMARY

According to the present invention, these above-mentioned problems are overcome by employing a flexible, tape-like, gauge member which can be made of plastic or other lightweight and flexible material, such as aluminum or even steel. So that the gauge member can be self-supporting in the vertical position, a slight curvature is imparted with the radius of curvature being in a direction orthogonal to the linear dimension of the gauge element. However, if flexible materials were used, a thicker member, either flat, oval or presenting an elongated rectangular cross-section, could preserve the flexibility while keeping the faces of the gauge parallel.

In either embodiment, a rotary type printing process could be used to either print or emboss the measuring indicia upon the gauge element. The resulting gauge which may be retrofitted into existing housing is then lightweight and not easily broken in rough handling.

So long as the gauge member is of a material that can be self-supporting in the vertical direction, the gauge can be mounted either at the "top" of the tank or at the "bottom" of a tank. Naturally, the "bottom" installation permits a thinner, more flexible gauge since the member does not have to support itself against gravity but rather, is supported by gravity. However, for those applications where it is desired to mount the gauge in the "top" of the tank, it is only necessary that the gauge element be sufficiently strong to support its own weight in a vertical orientation without collapsing.

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is a cross-sectional view of an aircraft wing with a tank having gauge means embodying the invention mounted therein;

FIG. 2 is a fragmentary view of the extended gauge element according to a preferred embodiment of the present invention;

FIG. 3 is a cross-section view of the gauge element of FIG. 2 taken along the line 3—3 in the direction of the appended arrows; and FIG. 4 is a cross-section of an alternative flexible gauge element; and FIG. 5 is a cross-section of a different flexible gauge element having an oval cross-section.

DESCRIPTION OF THE PREFERRED EMBODIMENT

More particularly describing the invention and referring first to FIG. 1, there is shown an aircraft wing 10 in which a tank 12 is installed and shown in cross-section. The tank 12 can be considered as capable of being closed and customarily containing a liquid 14. Gauge means 16 embodying the invention is shown mounted in the tank 12.

The gauge means 16 includes generally an outer assembly or gauge housing 18 comprising a "lower" section 20 within the tank 12 and a portion 22 outside of the tank 12 and mounted in the wing 10; a gauge element or inner assembly 24 that is mounted in but movable vertically with respect to the housing 20; a float 26; and, as will later be described, means for orienting the gauge element vertically with relation to the float 26.

At its outer or exterior portion 22, the housing 18 is mounted to the wing 10 and a movable gauge element 24 engaging fitting 28 seats in the outer portion 22 of housing 20 and secures the gauge with a quarter turn latch.

The float 26, which is designed to float upon the liquid 14 in the tank 12 and be guided by the housing 18, as it rises and falls, is generally annular in shape to receive the housing 18. The float 26 may have a hollow chamber within which an annular permanent magnet 30 is placed. Alternatively, an assembly of individual magnets, as is known, may be employed.

A float support member, shown here as a resilient collar 32, rests on a shoulder 34 and is contained partially within the tubular section 24 to cushion and limit downward movement of the float 26 in the event the liquid 14 in the tank 12 should fall to a very low level.

The inner gauge element 24 is fitted with a cap 38 that includes a spring member 38 and an o-ring 40 together with quarter turn latching means 42 that cooperates with fitting 28 so that the inner gauge portion can be locked in place wholly within the housing. Upon turning the assembly for releasing the inner element, the gauge element 24 springs out sufficiently far to be grasped manually.

The inner gauge member 24 is fitted at its remote end with a magnetic element 44 that can cooperate with the float element 26 to magnetically link the two together. The gauge itself, in a preferred embodiment, is a thin flexible tape-like member 46 which is substantially self-supporting. This can be accomplished by imparting a slight curvature or bowing to the gauge member 46 so that it may be considered an elongated section of a cylinder with a radius of curvature at right angles to the long dimension.

Referring now to FIGS. 2 and 3, indicia 48 may be imprinted or embossed on the gauge member 46 corresponding to the tank in which it is to be utilized. Obviously, if the tank were perfectly symmetrical, then the indicia 48 would be equally spaced. Alternatively, if the tank were not perfectly symmetrical, then the gauge could be calibrated to accurately reflect the quantity of liquid in the tank as a function of the liquid level.

Since the float 26 and its associated magnetic element 30 is positioned at the surface of the liquid 14, in operation, the gauge member 24 is unlatched and is manually withdrawn until the magnetic members interact and become attracted to each other. At this point, the gauge element 24 will be held in place by the magnetic forces and the volume of liquid 14 stored in the tank 12 can be read from the exposed indicia 48.

Turning next to FIG. 4, in an alternative embodiment, the inner gauge element 24 may be made of a metal tape 50 similar to a measuring tape. Alternatively, it can be made of a flexible plastic material that can be self-supporting and yet flexible if subjected to forces not in the axial direction.

FIG. 5 illustrates yet another embodiment for the gauge element. As seen in FIG. 5, a relatively thin, cross-sectional shape, such as an oval or ellipse, is employed which can be of metal or plastic. As shown, the cross section may be defined as bi-convex to include oval and elliptical shapes.

So long as the tape will bend rather than break when subjected to lateral forces, virtually any cross-sectional shape is usable.

Thus, there has been shown a new and improved stick gauge that is flexible and capable of supporting itself when held vertically from a lower end. The stick can be either a metal or plastic tape and, if desired, can be given a slight curve in a radial direction orthogonal to the elongate direction. When curved, a thinner member can still be self-supporting in a vertical orientation.

Other variations and embodiments will occur to those skilled in the art in accordance with the teachings and, therefore, the scope of the invention should be limited only by the breadth of the claims appended hereto.

What is claimed as new is:

1. A stick for a liquid level gauge adapted to be wholly contained within a tank, said stick always being free to be in stressful contact with bodies outside the tank when said stick is at least partially exposed outside the tank, said stick carrying magnetic means for cooperatively engaging magnetic floating means for positioning said stick to represent fluid level, said stick comprising:

an elongated, flexible plastic slat-like member of substantially elongated cross section having measuring indicia on at least one face thereof, said member being sufficiently rigid to resist coiling and be self-supporting vertically without bending when supported from a lower end, said stick during normal measurement being able to flex upon stressful contact with bodies outside the tank instead of breaking or otherwise causing damage.

2. The stick of claim 1 above, wherein said stick cross section is rectangular.

3. The stick of claim 1 above, wherein said stick cross section is substantially bi convex.

4. A liquid level gauge for use with a tank, comprising in combination:

a tubular housing arranged to be secured in the tank with its interior separated from the contents of the tank;

a float, slidably mounted exterior to said housing for motion relative thereto with liquid level changes;

first magnetic means carried by said float; and a measuring stick, insertable in said housing and carrying second magnetic means, said stick always being free to be in stressful contact with bodies outside the tank when said stick is at least partially exposed outside the tank, said first and second magnetic means being arranged to co-operate to support said stick at a height exterior to the tank corresponding to the liquid level within the tank, said stick comprising a relatively flexible, thin slat of bi-convex cross secretion bearing graduation marks on at least one surface thereof, said stick being sufficiently rigid to be self-supporting vertically without bending when supported from a lower end, and sufficiently inflexible to resist coiling, said stick during normal measurement being able to flex upon stressful contact with bodies outside the tank instead of breaking or otherwise causing damage.

5. For use with a liquid level tank gauge combination, the process comprising measuring liquid level by means of an elongated plastic member of elongated cross section carrying measuring indicia on at least one surface thereof, said member always being free to be in stressful contact with bodies outside the tank when said member is at least partially exposed outside the tank, said member being flexible yet capable of being self-supporting when held at one end in a substantially vertical orientation as an improved measuring element to visually display the level of liquid within a tank, said element during normal measurement being able to flex upon stressful contact with bodies outside the tank instead of breaking or otherwise causing damage; said longated member is placed in position in said tank and is observed.

6. The process of claim 5, above wherein said member is an elongated flexible slat having a bi convex cross section, the radii of curvature of which are orthogonal to the elongate dimension, and said slat is sufficiently inflexible to resist coiling.

* * * * *